United States Patent [19]

Bogen

[11] 4,118,321
[45] Oct. 3, 1978

[54] DEVICE FOR TANKS OF CIRCULAR TYPE SUCH AS, FOR EXAMPLE, THICKENERS, SLUDGE TANKS, MIXING TANKS AND THE LIKE

[75] Inventor: Jan O. Bogen, Sala, Sweden

[73] Assignee: Sala International AB, Sala, Sweden

[21] Appl. No.: 745,535

[22] Filed: Nov. 29, 1976

[30] Foreign Application Priority Data

Nov. 28, 1975 [SE] Sweden .............................. 7513429

[51] Int. Cl.² .............................................. B01D 21/18
[52] U.S. Cl. ..................................... 210/91; 210/143; 210/531
[58] Field of Search ................. 210/91, 143, 145, 147, 210/531

[56] References Cited

U.S. PATENT DOCUMENTS

| 2,553,958 | 5/1951 | Chelminski et al. | 210/143 |
| 2,585,006 | 2/1952 | Granea et al. | 210/531 X |
| 2,837,215 | 6/1958 | Chelminski | 210/531 |
| 3,390,782 | 7/1968 | Liebowitz | 210/531 |
| 3,704,789 | 12/1972 | Jablon | 210/531 |

Primary Examiner—John Adee
Attorney, Agent, or Firm—Young & Thompson

[57] ABSTRACT

The present invention relates to a device for tanks of circular type, such as for example thickeners, sludge tanks, mixing tanks and the like, in which at least one scraper arm, mixing arm or the like is journalled, as well as mounted in the center of the tank so as to be raisable and lowerable, and in which there are drive means capable of imparting a sweeping motion to the arm and its scrapers over the bottom of the tank. According to the invention an element is arranged extending between the periphery of the tank and its center, which element is longitudinally movable in relation to the periphery of the tank and is sufficiently rigid to be capable of transferring active or reactive forces to an extent at least corresponding to the torque of the scraper-carrying arm or the like.

5 Claims, 5 Drawing Figures

DEVICE FOR TANKS OF CIRCULAR TYPE SUCH AS, FOR EXAMPLE, THICKENERS, SLUDGE TANKS, MIXING TANKS AND THE LIKE

Devices for tanks of circular type, such as, for example, thickeners, sludge tanks, mixing tanks and the like, are known in which at least one scraper arm, mixing arm or the like is journalled, as well as mounted in the center of the tank so as to be raisable and lowerable, and in which there are drive means capable of imparting a sweeping motion to the arm and its scrapers over the bottom of the tank.

In such devices the scraper arm or the like is usually journalled in the center of the tank with the help of a vertical, so called scraping axle, which transfers the required torque for the driving of the scraper arm and is raisable and lowerable together with the scraper arm. Because of its triple function as bearing element, torque transferring drive means and operating means for the vertical movements of the scraper arm or the like, there have been significant problems with this axle when the tank diameter is larger than ca. 20 m. In tanks of this type the torque required for the sweeping motion of the scraper arm or arms over the bottom of the tank, is so great that it makes it difficult to also use the scraping axle for vertical operation of the scraper arm or arms. To be able to serve as operating means for the raising and lowering movements of the scraper arms, the scraper axle, transferring torque at the same time, in addition to being journalled for rotary motion, is also journalled for axial sliding movements with the aid of one or more axial key grooves in the surface of the scraper axle. Keys are disposed in said grooves, which in turn engage corresponding internal grooves in the center of a worm gear wheel, which imparts to the axle the torque required for driving the scraper arms and which in turn is driven by a worm screw belonging to the drive machinery of the device. For raising or lowering the scraper arm or arms, in these known devices, the upper end of the vertical scraper axle is connected to a lifting and lowering machinery.

But, as a result of the great torque required in tanks of the type in question with diameters greater than 20 m, the hole-edge pressure between the keys and the key grooves will be so great that it constitutes the critical parameter for the dimensioning of the device and results in the scraping axle and worm gear wheel with associated grooves and keys being much too large and unwieldy. If, on the other hand, the dimensions of these parts are kept within suitable limits there is a risk that the keys and key grooves especially can be deformed, thus jeopardizing the raising and lowering of the scraper arm or arms or the like.

The problems described here can of course be avoided in two ways which are known per se, but both lead to other problems and therefore they are not final solutions to the problems involved with the construction and operation of the devices described here in the introduction.

One of these methods involves, quite simply, providing the scraper arm or arms or the like in tanks of large diameter with so-called circumferential drive. In this type of drive, however, undesirably complicated devices are required for raising and lowering the scraper arms, and this problem, as far as is known, has still not received a satisfactory solution.

In the other method the so-called center drive of the scraper arm(s) is retained, without the use of the scraper axle mentioned previously. Instead this type of installation is provided with a thick pillar, which is placed in the center of the tank and is most often made of concrete. On the top of this pillar, whose upper end extends above the fill level of the tank, the machinery is placed for both the sweeping movement of the scraping arm(s) over the bottom of the tank and for raising and lowering the same. Usually the required torque from the drive machinery is transferred to the scraper arm with the help of a telescoping frame construction or the like surrounding the pillar. This construction, in addition to being joined to the scraper arms and being coupled to the drive machinery for producing the sweeping movements of the arms, is also coupled to the machinery for the raising and lowering movements of the arms and can itself be raised and lowered together with the arms. In raising and lowering, the scraper arms are generally lifted together with the associated machinery relative to the center pillar.

In the devices constructed in this manner, a number of guides are placed on the pillar for absorbing torque. These are guides for the raising and lowering of said telescopic frame construction. So that there is as little pressure as possible on these guides, they are placed with as great a distance from one another as the center pillar allows. This causes difficulties in making the contact pressures against the various guides equal. These problems increase if more than two guides are used. The orientation and adjustment of these guides can also cause problems in the assembly of thickener machinery. At the same time, this construction causes the friction occurring in the raising and lowering of the scraper arms to be so great as to be troublesome.

For very large thickeners, it has not been possible to construct a drive machinery which would permit raising and lowering of the scrapers. These large thickeners consist of a very thick hollow center pillar which carries the thickener machinery at the top. This machinery is journalled on a hydrostatic bearing to reduce the friction, with gear ring drive. The pillar is surrounded by a framework construction, which transmits the rotary motion to the scraper arms.

The removal of the thickened product is usually done through a tunnel under the thickener from the center to the side. The construction of this tunnel is expensive and therefore the use of hollow center pillars has become more common, especially in larger thickeners. The thickened material is pumped through the hollow center pillar with the help of a submersible pump, an air lift, diaphragm pump or other pump on the bridge with a suction duct to the bottom of the pillar, a centrifugal pump in the upper portion of the pillar with a suction duct (snorkel) in the inlet, or in another known manner.

Large thickeners have a space in the interior of the pillar and its extension downward where the pumps for the thickened material are located. The pipes for the thickened material can either be buried under the thickener or led up through the drive mechanism continuing to the periphery of the thickener over the surface of the liquid. In this case also the expensive tunnel has been eliminated.

The present invention has the purpose of removing the disadvantages mentioned in devices of the type mentioned in the introduction. To this end it is suggested according to the invention that an element be arranged extending between the periphery of the tank and its center, said element being longitudinally movable in relation to the periphery of the tank and being sufficiently rigid to be capable of transferring active or reactive forces to an extent at least corresponding to the torque of the scraper-carrying arm or the like. Providing devices of the type mentioned in the introduction with such elements according to the invention, instead of keys and key grooves in the center pillar, produces a comparatively simple and uncomplicated construction, through which, even with large tank diameters, those frictions can be avoided which occur in the constructions described in the introduction when the scraper arms are raised or lowered, and where the tanks are provided with a center pillar, on which the drive machinery is placed. The need for the known guides on the center pillar is also removed by the invention. The element according to the invention can either be or not be jointed to the center for vertical movements.

To check the size of the reaction forces transferred by the element, a sensing means can be arranged according to the invention between the element in question and a member which is stationary in relation to the tank. In known thickeners it is very difficult to measure the torque on the thickener arms satisfactorily. The known methods of measuring the power consumption of the drive motor or of directly measuring in the thickener machinery the transferred moment, often produce unreliable results. A sensing device according to the invention, a load cell for example, between a fixed point at the periphery of the thickener and the torque-transferring element can, on the other hand, give very exact values. The indicated torque can be used for automatic control of the raising and lowering of the scrapers. It is also possible to allow the indicated force, and possibly a signal showing the vertical position of the scrapers, to control the pumping of exiting under-flow material to obtain an optimal level of thickened material in the thickener. The known method for measuring the amount of product in a thickener involves measuring the density of the product at several levels in the thickener and is very expensive.

A device according to the invention can be used in tanks of circular type, which, for example, are part of sedimentation plants such as thickeners, sludge tanks and the like, and in different types of mixing tanks, including both those in which a mixture is made and those in which a prepared mixture is kept.

According to the invention it is possible to make passages in the drive head for pipes and electric cables, if needed, for a submersible pump, a pump on the platform of the thickener or tank, or another known pumping device for pumping of the product through the pillar. To gain access to the interior of the pillar a manhole is placed in its side and in the side of the scraper-bearing device if this has the shape of a cylinder. In some cases, however, it might be better to give the device the form of an open frame work which allows free access to the pillar.

Another possible embodiment of the invention is to extend the hollow pillar up through the gear ring. The gear ring is joined to the raising and lowering mechanism by means of an elongated device surrounding the center pillar. In said device and in the pillar there is at least one opening for access to the interior of the pillar even when the thickener is in operation. To avoid unnecessary torque stresses in the elongated device the element jointed to the center for vertical movements should be joined to the drive head close to the ring gear.

The previously known large thickeners have a gear rim with a very large diameter. According to the invention it is possible to construct a large thickener with raisable and lowerable scrapers and sufficiently large openings through the interior of the gear rim to allow the passage of pipes and personnal and even allow for the replacement of pumps and motors.

The invention will be described in the following with reference to the accompanying drawings showing examples of the invention.

Figure 5:
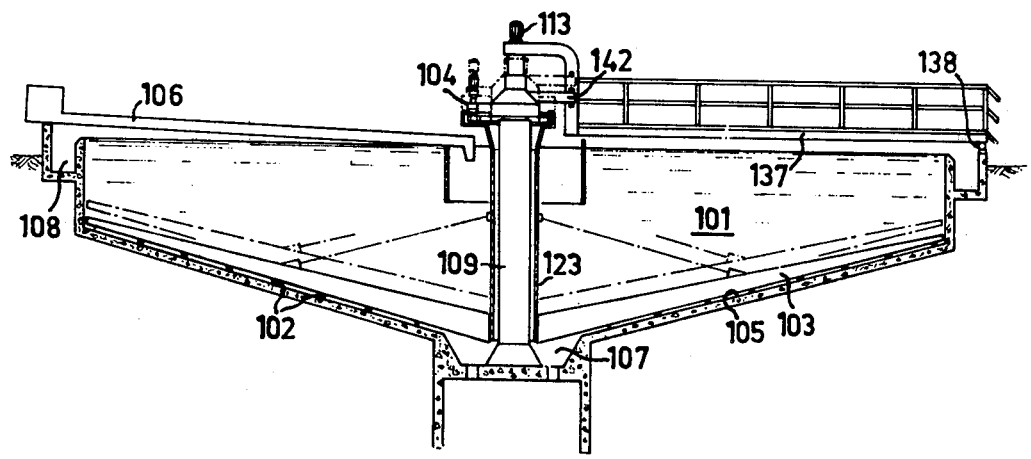

Finally FIG. 5, in a cut-away side view shows a second embodiment of the invention, onto which embodiment a stop is fixed on the raisable and lowerable portion of the center of the tank intended to abut an element extending between the periphery of the tank and the center.

A device according to the invention is used in tanks 1 of circular type such as, for example thickeners, sludge tanks, mixing tanks and the like, in which at least one arm 3, provided with scrapers 2, is journalled, as well as carried so as to be raisable and lowerable at the center of the tank, and in which there are drive means 4, capable of imparting a sweeping movement over the bottom 5 of the tank to the arm or arms 3, with associated scrapers 2.

Figure 1:
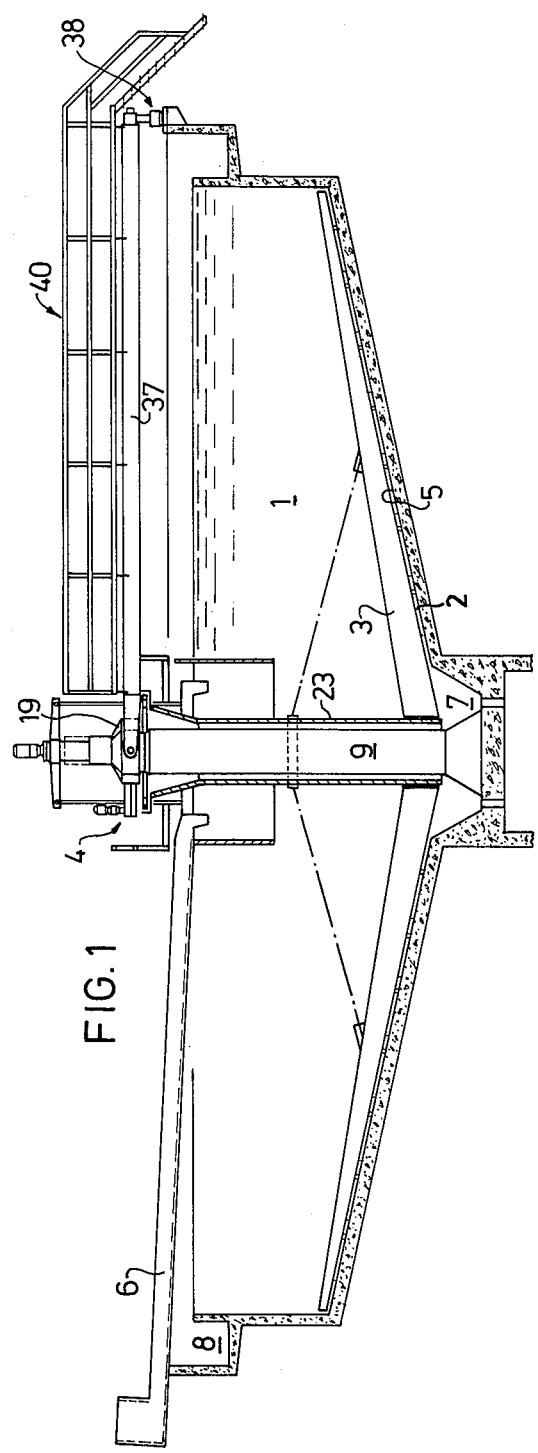
FIG. 1 shows a cut-away side view through a first embodiment for a device according to the invention used in a tank of circular type with so-called center drive.
Figure 2:
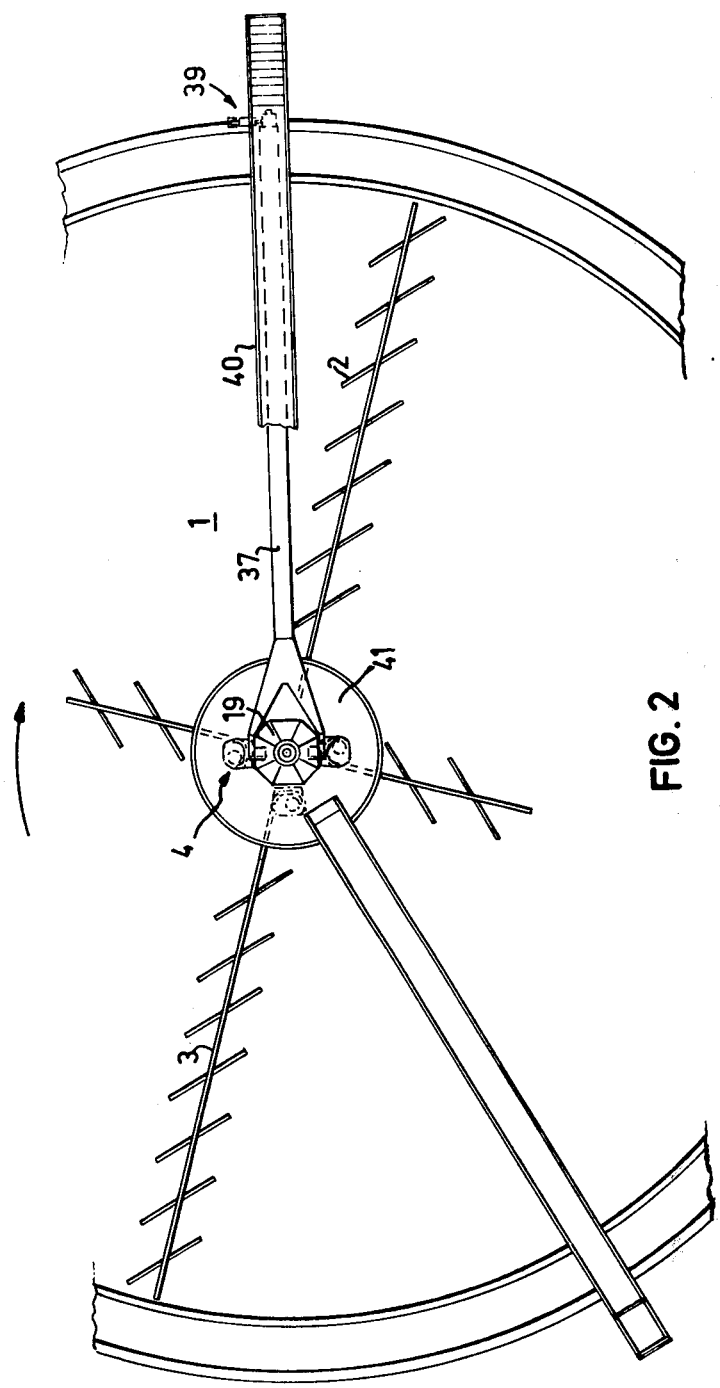
FIG. 2 shows an only partially represented overhead view of the device shown in FIG. 1
Figure 3:
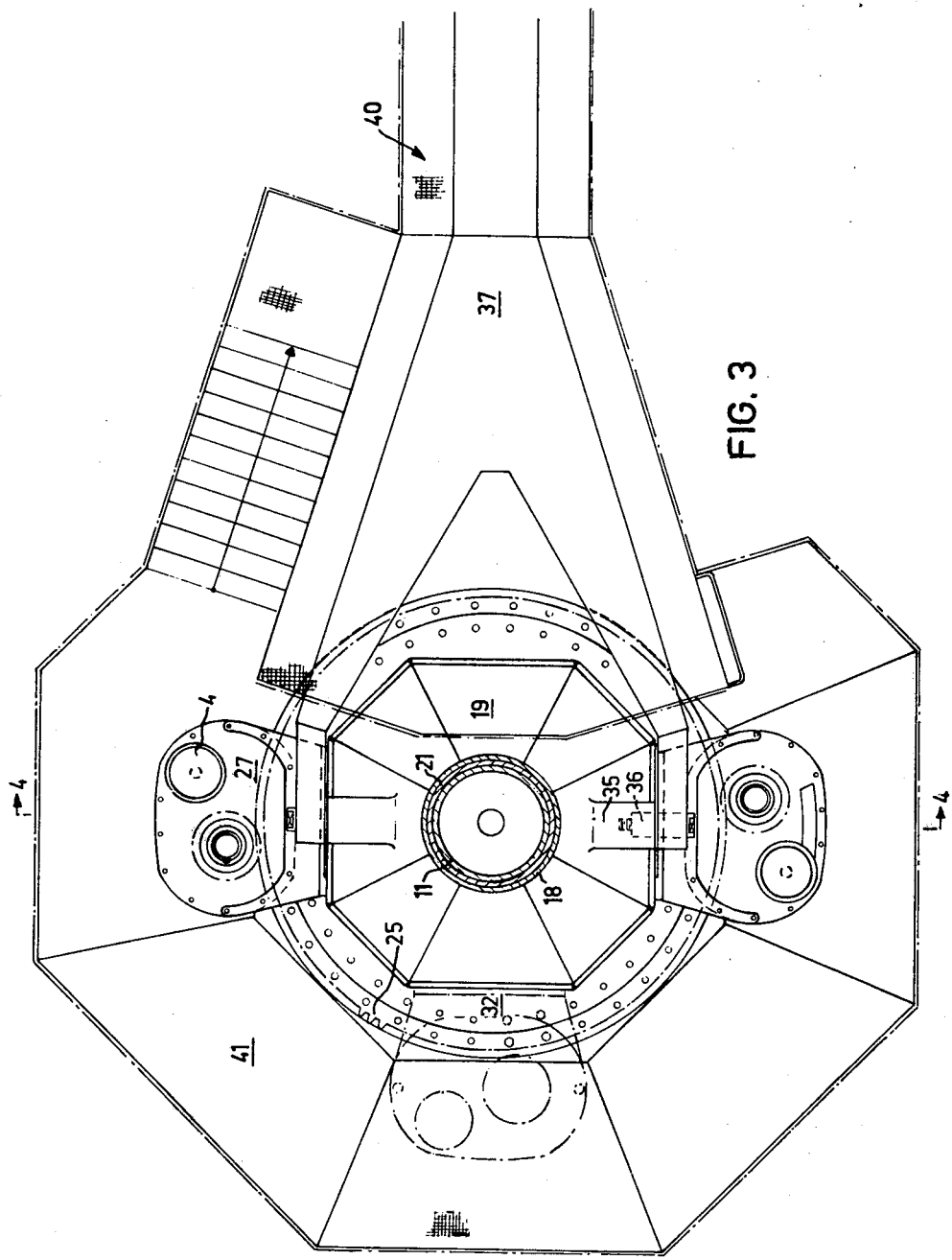
FIG. 3 is an overhead view with a larger scale of the central portion of the device shown in FIG. 2.

If the tank in FIGS. 1 and 2 is to be used as a thickener the material intended for treatment is fed in through a slightly inclined gutter 6 from the edge of the tank to the center. As the sedimentation proceeds the material settles to the bottom of the tank 5 and is pushed by the scrapers 2 in towards the center outlet 7. The now thickened material can then finally run freely out through a bottom drain bowl or can be sucked out with the aid of a directly connected pump. The "pure" liquid, on the other hand, runs over a spill-way and down into a collection gutter 8, which runs around the circumference of the tank 1. The tanks themselves are usually made of concrete, and this is always the case for tanks of very large diameters.

To prvent overloading of the drive machinery of the scrapper arms 3, these arms, with their associated scrapers are made so that they can be raised and lowered.

In the embodiment of the invention shown in FIGS. 1–4, a concrete pillar 9 is disposed in the center of the tank 1, sticking up with its upper end above the level of the tank's spill-way.

Figure 4:
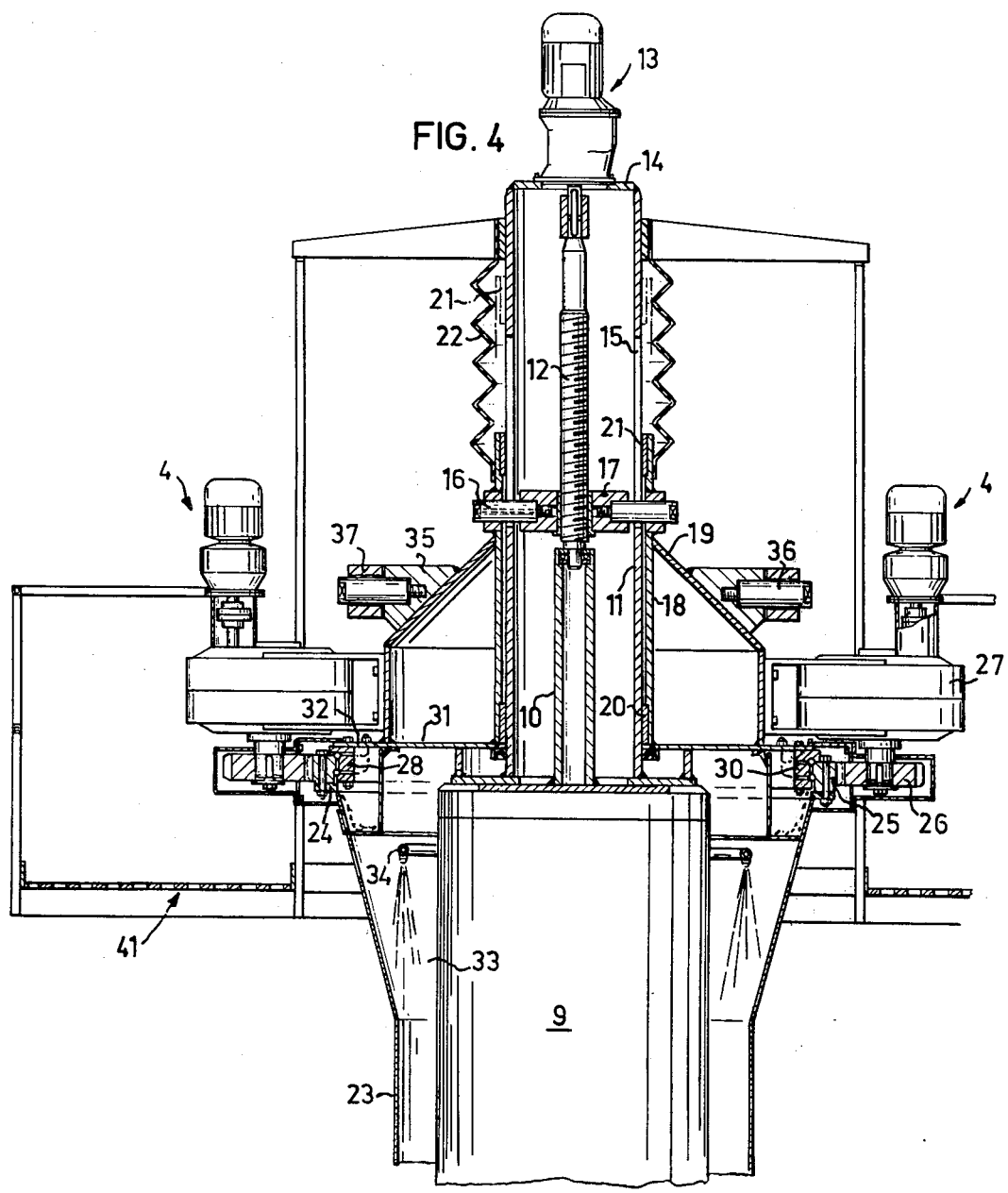
FIG. 4 is a side view cut along the line 4—4 in FIG. 3 of the central portion of the device shown in FIG. 2.

As is most clearly shown in FIG. 4, for this purpose, the upper end of the center pillar 9 is equipped with two vertical concentric tubes 10, 11, of which the inner one 10 is shorter than the outer one 11. In the upper end of the stationary inner tube 10, the lower end of a threaded axle 12 is rotatably journalled. At its upper end this axle is joined to raising and lowering machinery 13 (which is known per se and is not described in more detail here). This machinery is disposed on top of a plate 14, which is welded to the upper end of said outer tube 11, which, as is the inner tube 10, is fixedly mounted on the center pillar 9. In the wall of the outer tube 11 there are two vertical slots 15 located diametrically opposite to one another. Pins 16 are disposed in these slots, which are attached at their inner ends to a block 17, running on the thread of the axle 12. The outer end of these two pins is attached to a third tube 18, which surrounds the tube 15 with the slots and is joined, via a metal casing 19 welded to the tube 18, to the drive units 4 for the sweeping movements of the scraper arms 3 as well as the scraper arms themselves. Consequently, the raising and lowering machinery 3 is capable, as needed, of moving the drive machinery for the sweeping movement of the scraper arms as well as the actual scrapers. More precisely, this occurs by the raising and lowering machinery 13 turning the threaded axle 12 in the intended direction, so that the block 17 moves in the proper direction on the axle thus moving the pins 16 in the slots 15 in the tube 11, so that the tube 18 and the casing 19 with the attached drive units 4 also follow the vertical movement. To facilitate the relative sliding between the tubes 11 and 18, there are bushings 20, 21 at both ends of the tube 18. A bellows 22 is also suitably disposed around the upper end of the tube 18 and the slotted portion of tube 11.

The transfer of the vertical movements produced with the aid of the raising and lowering machinery 13, to the scraper arms 3 and the scrapers 2, is done with the aid of a cylindrical element 23, which at its lower end is attached to the scrapper arms and which as a whole surrounds the center pillar 9. At its upper end this cylindrical element 23 is broadened conically and is provided at the very top with a thick annular flange 24. A gear ring 25 is fixed to this flange. This gear ring extends around the whole circumference of the conically widened upper end of the cylindrical element 23. The teeth on this ring 25 are located on the outer periphery of the ring where they engage the driving gears 26 attached to axle shafts outgoing from gear boxes 27 belonging to the drive units 4 for making the scraper arms 3 sweep along the bottom 5 of the tank 1. On the inside the gear ring 25 is provided with races, which with the help of rolling bodies, ball bearings 28 for example, interact with corresponding races in a thick annular element 30, which is screwed down on the casing 19 which carries the drive units 4, or more precisely to the underside of a bottom 31 of the same which extends out beyond the actual casing with an annular flange 32. As a result of the journalling which the gear ring 25 has on the thick element 28 attached to the casing bottom 31, the cylindrical element 23 and thereby the scraper arms 3 also will hang freely under the casing 19 in such a way that said arms with associated cylinder are rotatable around the center pillar as a result of the torque which the drive units 4 with the aid of the gears 26 impart to the toothed ring 25 on the cylindrical element 23.

To keep the space 33 between the center pillar 10 and the cylindrical element 23 free from major collections of material, which can hinder the vertical movements as well as the sweeping movements of the scraping arms, flushing means 34 are arranged in this space.

To absorb the reaction of the torque by which the scraper arms 3 are caused to sweep over the bottom of the tank, the casing 19 is provided with two brackets 35, into which a pair of pins 36 are screwed. A crutch-shaped element 37 is attached to the projecting free ends of these two pins 36 which extends between the periphery of the tank 1 and the raisable and lowerable center. Due to its crutch-shape and because it is hung on the pins 36 with its split end, the inner end of the element 37 is raisable and lowerable together with the rest of the raisable and lowerable parts of the center portion of the device. To be able to transfer action or reaction forces corresponding to the torque of the scraper arms, to the periphery of the tank, said element is movable in relation to the periphery of the tank with the aid of one or possibly two flexible joints, which are shown at 38. A sensing device can also be arranged between the crutch-shaped element 37 and a member which is stationary in relation to the tank for checking the size of the reaction forces transferred by the element 37. Such a sensing device is shown at 39 and can consist of any device which is suitable for the purpose. For example this sensing device can be arranged to give signals to the raising and lowering machinery 13 to raise the scraper arms 3 if the resistance to the sweeping movements is too great in the tank. Conversely, the sensing device 39 can also be arranged to produce a signal when the scrapers begin to move too easily in the tank, at which time a lowering of the arms is desirable.

As is evident from FIGS. 1–4, a walking bridge 40 can be arranged on the crutch-shaped element 37. This bridge can suitably be connected to a platform 41, which surrounds the rotationally stationary casing 19 at the center of the device. It is normally desirable to have access to the drive machinery of the thickener via a walk-bridge. The walk-bridge thus has the double function of walk-bridge and torque transferring element.

The invention is not limited to the torque transferring element having a crutch-like shape, but relates to each element which is connected to the center and can transfer torque to a fixed point at the periphery of the thickener. For example the element can be a walk-bridge of common design with two parallel beams which carry the walkway and an overhead framework. In one end there are two projecting beams with bearings for pins 36 and at the other end the walking bridge is movably hung/lain and attached to a fixed point at the periphery of the thickener.

In the embodiment shown in FIG. 5, the element 137 extending between the center pillar 109 and the periphery of the tank, is also constructed as a walking bridge; but in contrast to the embodiment shown in FIGS. 1–4, it is not vertically movable together with the raisable and lowerable portion of the center portion, but is fixed in relation to the center pillar. Instead the raisable and lowerable portion of the center of the tank is provided with a stop 142, which is intended to abut the element 137. At the place of contact between the stop, which has the general form of an overhung projection, and the element-walking bridge 137, there is suitably some form of bearing or sliding surface for the movements of the stop 142 against the relatively stationary element 137 when the raisable and lowerable center portion moves vertically.

A movable support 138 for the element 137 should be arranged at the periphery of the tank, allowing the element a certain mobility, primarily longitudinally. It is also suitable to arrange a sensing device in the manner of the embodiment shown in FIGS. 1–4.

The invention is not limited to what is described here and the embodiments shown in the drawings, but can be modified in many ways within the scope of the claims.

What I claim is:

1. In a circular tank having at least one arm extending radially outwardly over the bottom thereof, a central pillar coaxial with the tank, means supporting said arm on said pillar for vertical movement relative to said pillar, and means for swinging said arm about said axis; the improvement comprising a rigid element that extends generally radially outwardly of said support means and that is secured adjacent its outer end to a fixed point on the periphery of said tank, and means acting between said supporting means and said element to permit vertical movement of said support means relative to said outer end of said element and to transmit torque from said support means to said element.

2. Apparatus as claimed in claim 1, said acting means comprising means interconnecting said support means and the inner end of said element for vertical swinging movement of said element relative to said support means about a horizontal axis.

3. Apparatus as claimed in claim 1, said acting means comprising a stop on said support means that bears against said inner end of said element to transmit said torque and that moves vertically against and relative to said inner end of said element upon raising and lowering of said arm.

4. Apparatus as claimed in claim 1, and means mounting said outer end of said element on said periphery of said tank for limited longitudinal movement of said element relative to said tank.

5. Apparatus as claimed in claim 1, and sensing means disposed between said element and a member which is stationary relative to the tank to determine the size of the reaction forces transferred to the outer periphery of the tank by said element.

* * * * *